United States Patent [19]

Caude et al.

[11] Patent Number: 4,795,538

[45] Date of Patent: Jan. 3, 1989

[54] ELECTROCHEMICAL PROCESS FOR RECOVERING METALLIC RHODIUM FROM AQUEOUS SOLUTIONS OF SPENT CATALYSTS

[75] Inventors: Marie-Celine Caude, Villiers Sur Orge; Didier Morel, Neris Les Bains; Jean-Pierre Pulicani, Antony, all of France

[73] Assignee: Rhone-Poulenc Sante, Courbevoie, France

[21] Appl. No.: 171,258

[22] Filed: Mar. 21, 1988

[30] Foreign Application Priority Data

Mar. 25, 1987 [FR] France .................................. 87 04129

[51] Int. Cl.⁴ ............................................... C25C 1/20

[52] U.S. Cl. ................................... 204/111; 204/109; 204/47

[58] Field of Search ............... 204/149, 151, 130, 140, 204/111, 109, 47

[56] References Cited

U.S. PATENT DOCUMENTS 4,377,450 3/1983 Okinaka ................................ 204/47

Primary Examiner—R. L. Andrews
Attorney, Agent, or Firm—Stevens, Davis, Miller & Mosher

[57] ABSTRACT

Metallic rhodium is recovered from aqueous solutions of spent catalysts by acidification and oxidation followed by electrolysis.

10 Claims, No Drawings

ELECTROCHEMICAL PROCESS FOR RECOVERING METALLIC RHODIUM FROM AQUEOUS SOLUTIONS OF SPENT CATALYSTS

The present invention relates to an electrochemical process for recovering rhodium in metallic form from aqueous solutions of spent catalysts.

Rhodium, generally in the form of a salt or complex, is employed as a catalyst for performing many syntheses in organic chemistry.

Rhodium is a relatively rare metal and its cost is high. It is particularly important to be able to recover it from a catalyst which has lost its effectiveness, so that it can be recycled.

It is known to recover rhodium from complexes which are soluble in an organic medium. Generally, the known processes consist in destroying the catalyst (e.g. by oxidation, acidic or alkaline attack, displacement by a stronger ligand, or combustion) to produce a recoverable form of the rhodium (e.g. a soluble or insoluble inorganic rhodium salt, or a complex of sufficient polarity) from which the rhodium can be recovered (e.g. by electrochemical reduction, filtration, combustion, liquid/liquid-extraction, or fixation on a support).

However, in the case of organic rhodium complexes, electrochemical reduction does not produce metallic rhodium but derivatives in which rhodium is in the oxidation state of zero (see, for example, E. Markrlik et al, J. Organomet. Chem., 1977, 142 (1), 95–103). It is possible, however, to obtain the deposition of metallic rhodium on an electrode by employing inorganic salts or inorganic complexes of rhodium in the presence of judiciously chosen electrolytes (see, for example, Chem. Abstr. 1984, 100, 147437q).

It is known to employ water-soluble catalyst systems consisting of an inorganic or organometallic rhodium derivative and of a water-soluble phosphine (sodium salt of trisulphonated triphenylphosphine or NaTPPTS) to perform chemical reactions. For example, by employing a catalyst of this kind it is possible to perform the selective addition of a compound containing an active methylene group, such as a $\beta$-ketoester, to a terminal conjugated diene (European Patent EP No. 44,771), the addition of a cyclic secondary amine to a terminal conjugated diene (European Patent EP No. 185,559), the selective alkylation of phenols (European Patent Application EP No. 161,132), or olefin hydroformylation (FR No. 2,349,652). In general, when the reaction is finished, the aqueous phase, whose pH is close to neutrality, consists essentially of rhodium in the form of organometallic complexes, of sulphonated phosphines and of their degradation products (phosphine oxides), water, the alcohol (methanol) employed as cosolvent and of organic products (reactants and reaction products). Although the catalyst can be recycled, it must be regenerated after a determined number of operations.

It has now been found, and it is this that forms the subject of the present invention, that it is possible to recover rhodium in metallic form by electrochemical reduction of an aqueous solution of a water-soluble catalyst containing essentially an inorganic or organometallic rhodium derivative, a water-soluble phosphine and its degradation products, which has previously been subjected to an appropriate oxidation and acidification treatment.

The process of the present invention for recovering rhodium in metallic form from an aqueous solution containing an organic rhodium complex and in particular from a solution of a spent catalyst as described above comprises (a) treating the aqueous solution with an oxidizing agent and a strong acid, (b) electrolysing the solution thus obtained between an anode and a cathode, and (c) recovering metallic rhodium deposited on said cathode.

The oxidizing treatment is intended to convert the residual trivalent phosphorus into pentavalent phosphorus and the monovalent rhodium to trivalent rhodium. The acidification is necessary for the rhodium to be in an electroreducible form.

It is particularly advantageous to carry out the pretreatment on a preconcentrated aqueous solution of spent catalyst in order to have a solution containing a higher concentration of rhodium, from which most of the organic solvents, reaction products and the residual reactants have been removed. Generally, a concentrated solution is used whose volume represents approximately one third of the initial volume, so as to have a rhodium concentration of between 1 and 5 g/liter. The concentration is carried out by distillation, under reduced pressure if desired.

The oxidation of the solution of spent catalyst, concentrated if desired, is carried out by means of an agent of high oxidative power, preferably an alkali metal hypochlorite or chlorate, such as aqueous bleach or sodium or potassium chlorate, but other oxidizing agents, e.g. hydrogen peroxide, can also be used. The oxidation can be effected at a temperature of between 20° C. and the reflux temperature of the reaction mixture. The oxidation is preferably carried out at the reflux temperature and is complete after a time which can be from 1 to 4 hours.

The acidification is carried out with the aid of a strong acid, so that the pH of the final solution is below 3 and, preferably between 0 and 1. It is particularly advantageous to employ a strong inorganic acid and especially hydrochloric, sulphuric, nitric or phosphoric acid. The acidification is preferably carried out at the reflux temperature of the reaction mixture, with the heating being continued for 1 to 4 hours.

For the purpose of performing the pretreatment of the aqueous solution of the spent catalyst system it is immaterial whether the acidification follows or precedes the oxidation.

The solution which is obtained after the oxidation and acidification treatments can be electrolysed directly.

The electrolysis may be carried out continuously or noncontinuously.

The electrolyser consists essentially of a cathode and an anode and, if desired, a diaphragm separating the cathode and anode compartments. The electrolyser may additionally comprise a reference electrode such as a saturated calomel electrode.

The cathode generally consists of an electrically conductive material whose melting point must be sufficiently low to permit the recovery of rhodium and which must withstand the corrosiveness of the medium. It is particularly advantageous to employ a cathode made of stainless steel, mercury, copper or lead. A copper or lead cathode is preferably employed.

The anode generally consists of an electrically conductive material which cannot be attacked under the conditions of the electrolysis. It is particularly advantageous to employ a graphite anode.

When a separator diaphragm is employed, this advantageously consists of a porous material such as, for example, a sintered glass plate or an ion exchange, preferably cation exchange, membrane. When a separator diaphragm is employed, the anode compartment contains an electrolyte which is preferably the acid employed to perform the acidification during the pretreatment operation.

When the electrolyser does not comprise a reference electrode, the current density at the beginning of the electrolysis is determined so that the reduction of rhodium is at its maximum while the reduction of the protons present in the strongly acidic medium is limited. The current density is generally between 0.5 and 2 $A/dm^2$. Because of the simultaneous reduction of some of the protons present in the medium, the electrical yield is not quantitative. The electrolysis is generally stopped after the passage of 50 faradays per gram-atom of rhodium.

When the electrolyser comprises a reference electrode (saturated calomel electrode), the potential applied to the cathode is chosen so that the reduction of rhodium is at its maximum while the reduction of the protons present in the strongly acidic medium is limited. The cathode potential is generally between $-0.25$ and $-0.55$ volt relative to the reference electrode.

In order to perform the process according to the invention, an electrolyser is generally employed in which the anode, the cathode and the separator diaphragm are in parallel vertical planes. However, when a mercury cathode is employed, the anode, the cathode and the separator diaphragm are in parallel horizontal planes.

An electrolyser comprising several anodes and cathodes arranged alternately and connected to the electrical supply by parallel circuits may be employed.

Furthermore, it is possible to combine a number of elementary electrolysers in series.

It is particularly advantageous to agitate the solution to be electrolysed either by means of a mechanical or magnetic stirrer or by circulation produced by a pump.

It is also possible to employ electrolysers to which additional devices are attached, such as heat exchangers, expansion vessels or instruments for measuring the temperature or the pH.

When the electrolysis is finished, the cathode(s) is (are) withdrawn from the solution and then rinsed with water and, if desired, with an organic solvent such as methanol or acetone and is (are) finally dried.

Depending on the adhesiveness of the deposit on the cathode, this is recovered by mechanical scraping or else is detached under the effect of ultrasonics in an aqueous medium.

The rhodium initially present in the solution is generally recovered in a yield greater than 80% in a solid form containing more than 50% (w/w) rhodium.

Metallic rhodium may be recovered ether by melting the cathode or by melting the deposit obtained after scraping the cathode, it being possible in the latter case for the cathode to be used again.

The rhodium in a metallic form which is obtained in this manner may be refined, according to known methods.

In this way, it is not necessary to employ a specific reducing agent which is usually employed to precipitate rhodium, such as a borohydride, zinc or iron.

The rhodium obtained according to the process of the present invention may, if desired, be converted into a salt (chloride, bromide, sulphate, nitrate) capable of being employed for preparing a complex which can be used as a catalyst in organic synthesis.

The following Examples illustrate the present invention.

EXAMPLE 1

1. Pretreatment

Into a 100-cc conical flask are introduced:
a solution (10 cc) of spent catalyst containing:
rhodium-sulphonated triphenylphosphine complex (estimated to contain 2.3 g/liter of rhodium)
trisulphonated triphenylphosphine, sodium salt and oxidation products (40.9% solids content)
organic products (1.4%)
a 15% aqueous solution of sodium hypochlorite (25 cc; d=1.22).

The flask is heated on a water bath at 80°–82° C. for 1 hour 20 minutes, with stirring. Hydrochloric acid (37%, d=1.19; 1.5 cc) is then added. Heating and stirring are continued for 1 hour 45 minutes.

The precipitate which forms (0.152 g) is separated from the solution by filtration on sintered glass. The precipitate contains 0.064% (w/w) of rhodium, which is recovered by combustion according to known methods.

2. Electrolysis

The pretreated solution (25 cc) is introduced into the cathode compartment of an electrolysis cell whose two compartments are separated by a cationic membrane.

A copper cathode in the form of a disc 2.4 cm in diameter is introduced into the cathode compartment. The anode compartment contains N hydrochloric acid (25 cc); a platinum grid of the same size is introduced therein. The cathode potential is set at $-0.3$ volt relative to a saturated calomel reference electrode. The solution is stirred. After the passage of 359 coulombs the electrolysis is stopped. The copper cathode is covered with a grey deposit which is recovered by scraping, rinsed with water and with acetone and then dried.

3. Results

The initial solution contained 16.25 mg of rhodium and the final solution after electrolysis contains 2 mg thereof. The efficiency of recovery is 88%.

The deposit recovered contains 46% of rhodium and 39% of copper.

EXAMPLE 2

1. Pretreatment

Into a 1000-cc conical flask are introduced:
spent catalyst solution (100 cc) identical with that employed in Example 1, and
15% strength sodium hypochlorite (300 cc).

The flask is stirred and kept on a water bath at 90°–94° C. for 1 hour 35 minutes. 37% strength hydrochloric acid (15 cc; d=1.19) is added. Stirring and heating are continued for 90 minutes. Filtration leads to the recovery of a reddish pasty precipitate (0.508 g) containing 0.3% of rhodium, which is recovered by combustion.

The volume of the filtrate is adjusted to 500 cc by adding water.

2. Electrolysis

Pretreated solution (250 cc) is introduced into an electrolysis cell without a separator diaphragm. A copper cathode and 2 graphite anodes with a surface area of 25 cm$^2$ are immersed on each side of and at an equal distance from the cathode. The voltage at the circuit terminals is set at 2.66–2.9 volts. The solution is stirred continuously. After the passage of 2530 coulombs, the electrolysis is stopped. The copper cathode is covered with a grey deposit containing a high content of rhodium.

3. Results

The initial solution contained 184 mg of rhodium and the final solution after electrolysis contains 25 mg thereof. The efficiency of recovery is 86%.

We claim:

1. A process for recovering rhodium in metallic form from an aqueous solution containing an organic rhodium complex, which comprises
   (a) treating the aqueous solution with an oxidizing agent and a strong acid,
   (b) electrolysing the solution thus obtained between an anode and a cathode, and
   (c) recovering the metallic rhodium deposited on said cathode.
2. Process according to claim 1 wherein the said aqueous solution is a solution of spent catalyst containing said rhodium complex, a sulphonated phosphine and oxidized derivatives thereof, and residual organic compounds and solvents and inorganic salts.
3. Process according to claim 1, wherein the said aqueous solution is concentrated before the treatment with the oxidizing agent and the strong acid.
4. Process according to claim 1, wherein the oxidizing agent used is an alkali metal hypochlorite or an alkali metal chlorate.
5. Process according to claim 1, wherein the strong acid used is hydrochloric, sulphuric, nitric or phosphoric acid and the said acid is used in an amount to bring the pH of the solution below 3.
6. Process according to claim 1, wherein the electrolysis is performed in an electrolyser comprising a cathode of stainless steel, mercury, copper or lead, and an anode consisting of an electrically conductive material which is not attacked under the electrolysis conditions.
7. Process according to claim 6, wherein the current density at the beginning of the electrolysis is 0.5 to 2 A/dm$^2$.
8. Process according to claim 6, wherein the electrolyser contains a saturated calomel reference electrode and the cathode potential is between −0.25 and −0.55 volt relative to the reference electrode.
9. Process according to claim 6, wherein the electrolyser includes a separator diaphragm, of sintered glass or an ion exchange membrane, and the anode compartment contains as electrolyte hydrochloric, sulphuric, nitric or phosphoric acid.
10. Process according to claim 1, wherein the metallic rhodium deposited on the cathode is separated mechanically.

* * * * *